(12) United States Patent
Nuttman

(10) Patent No.: US 8,418,403 B1
(45) Date of Patent: Apr. 16, 2013

(54) HANGING STACKED PLANT HOLDERS AND WATERING SYSTEMS

(76) Inventor: Thomas L. Nuttman, Gardena, CA (US)

( * ) Notice: Subject to any disclaimer, the term of this patent is extended or adjusted under 35 U.S.C. 154(b) by 0 days.

(21) Appl. No.: 13/081,320

(22) Filed: Apr. 6, 2011

Related U.S. Application Data

(60) Provisional application No. 61/322,500, filed on Apr. 9, 2010.

(51) Int. Cl.
*A01G 27/00* (2006.01)

(52) U.S. Cl.
USPC .................................................. 47/82; 47/83

(58) Field of Classification Search .................. 47/66.1, 47/66.6, 79, 82, 83, 86, 39, 45, 46, 47, 66.5
See application file for complete search history.

(56) References Cited

U.S. PATENT DOCUMENTS

| | | | | |
|---|---|---|---|---|
| 4,951,416 A | * | 8/1990 | Gutridge | 47/62 R |
| 5,411,562 A | * | 5/1995 | Saparzadeh | 47/58.1 R |
| 5,826,375 A | * | 10/1998 | Black | 47/67 |
| 6,840,008 B1 | | 1/2005 | Bullock et al. | |
| 7,458,475 B2 | * | 12/2008 | Ho | 211/85.23 |
| 2007/0144069 A1 | * | 6/2007 | Gottlieb et al. | 47/82 |
| 2010/0146854 A1 | * | 6/2010 | Cannon et al. | 47/82 |

OTHER PUBLICATIONS

The Center for Innovative Food Technology, A program of EISC, Inc., "CIFT Investigates High Density Vertical Growing System", http://www.eisc.org/news/news_66.php , (article undated, downloaded from Internet Feb. 3, 2010), pps. 1-2.

* cited by examiner

*Primary Examiner* — Rob Swiatek
*Assistant Examiner* — Lisa Tsang
(74) *Attorney, Agent, or Firm* — Blakely, Sokoloff, Taylor & Zafman LLP

(57) ABSTRACT

Hanging stacked plant holders and watering systems for receiving and supporting a plurality of pots in pot holding rings fastened to the end of a plurality of unit arms. The unit arms are stacked on a structure that includes an upper manifold and a lower manifold. The pots supported by the upper unit arms receive water from the upper manifold, and the pots supported by the lower unit arms receive water seeping through the upper pots, with water seeping through the lower pots being collected for recirculation. various features and construction details are disclosed.

10 Claims, 5 Drawing Sheets

HANGING STACKED PLANT HOLDERS AND WATERING SYSTEMS

CROSS-REFERENCE TO RELATED APPLICATIONS

This application claims the benefit of U.S. Provisional Patent Application No. 61/322,500 filed Apr. 9, 2010.

BACKGROUND OF THE INVENTION

1. Field of the Invention

The present invention relates to the field of plant holders and plant watering systems.

2. Prior Art

Plant holders of various kinds are well known in the prior art. Of particular importance to the present invention are plant holders that hold multiple plants, each in their own pots. Such plant holders are of use both for commercial growing purposes and for residential use for decorative purposes and for growing vegetables. What is needed for this purpose is a multiple plant holder that is capable of holding multiple plants, each in its own removable standard size pot, with a watering system that may collect water (with fertilizer) passing through the pots for manual or automatic recycling, thereby conserving water and achieving the greatest benefit of the fertilizer.

DETAILED DESCRIPTION OF THE PREFERRED EMBODIMENTS

Figure 1:
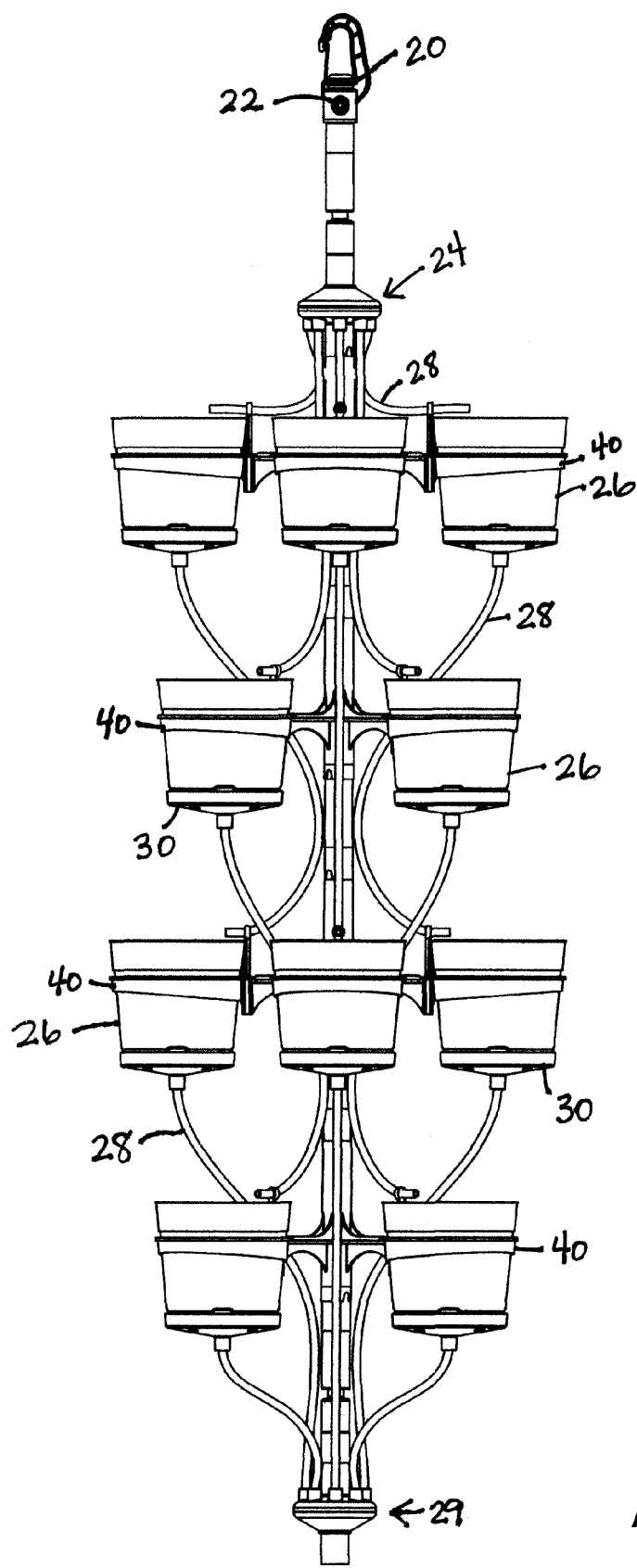
FIG. 1 is a side view of one embodiment of the hanging stacked plant holder and watering system of the present invention.
Figure 2:
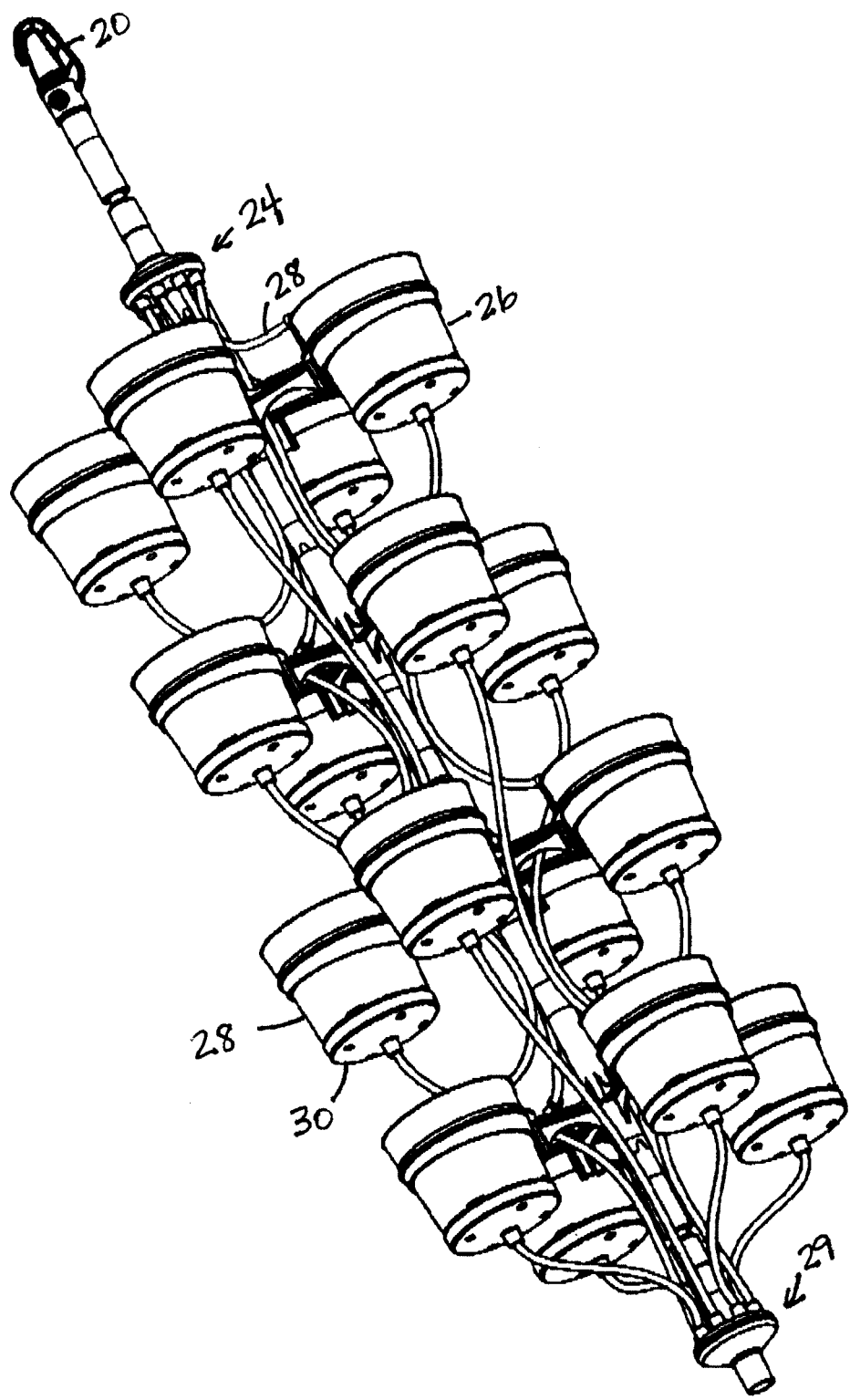
FIG. 2 is a view of the embodiment of the hanging stacked plant holder and watering system of FIG. 1 as seen from below.
Figure 3:
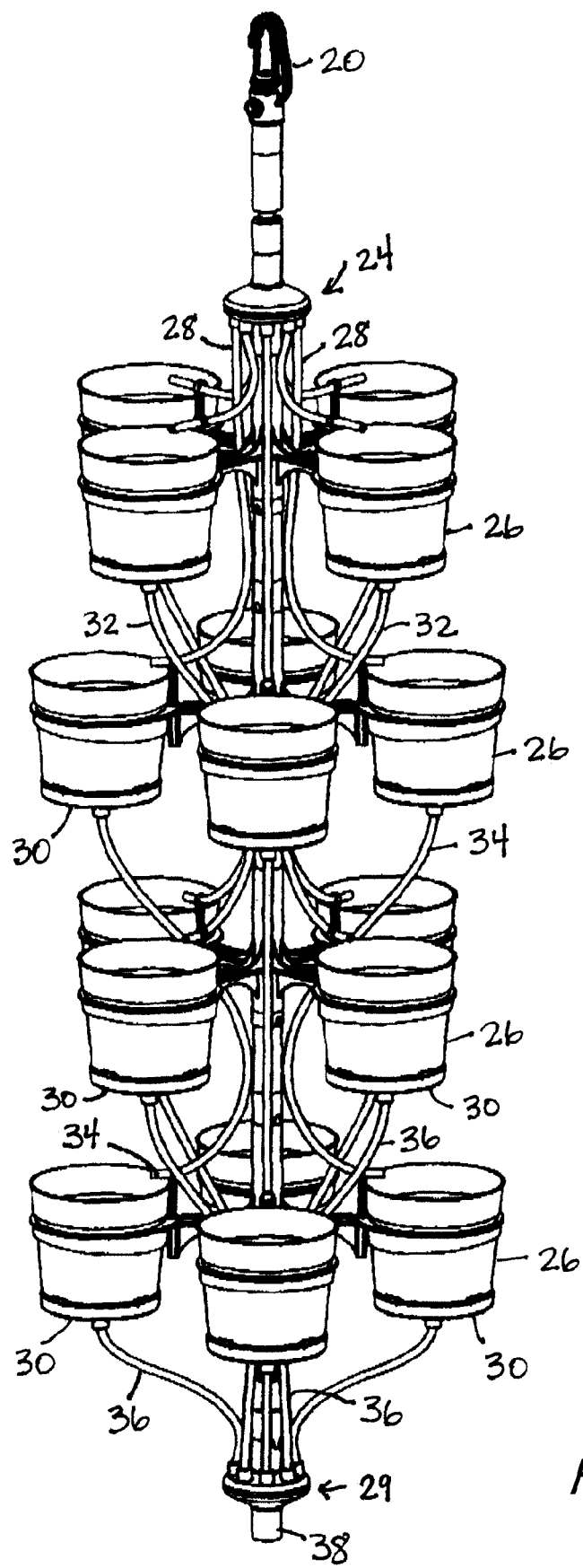
FIG. 3 is a view of the embodiment of the hanging stacked plant holder and watering system of FIG. 1 as seen from above.

One embodiment of the hanging stacked plant holders and watering systems of the present invention may be seen in FIGS. 1 through 3. The major elements of the system that may be seen in these Figures are the hangar 20 having a water inlet 22, a manifold assembly generally indicated by the numeral 24, a plurality of pots 26, a plurality of distribution hoses 28 and a second manifold assembly generally indicated by the numeral 29. The overall assembly of this embodiment supplies water to a total of 16 individual pots 26 in four vertical layers of four pots each. The manifold assembly 24 provides water at drip irrigation rates to eight distribution hoses 28, four of which supply water at drip irrigation rates to the top four pots 26, with the other four distribution hoses 28 interleaved with the first four distribution hoses supplying water to the second level of pots 26. Each pot has a catch tray 30 that snaps onto the pot and collects water which seeps through the soil in the pot to collect the same for distribution to the lower pots. In particular, water seeping through the top four pots is supplied through distribution hoses 32 to the third level (from the top) of pots 26, and water seeping through the second level of pots 26 provides water through distribution hoses 34 to the lowest level of pots 26. Water which seeps through the lowest level of pots 26, as well as the level immediately therebelow, is collected through respective catch trays 30 by distribution hoses 36 and lower manifold assembly 29 for output through pipe 38 for collection and recirculation.

As mentioned before, water is supplied to the water inlet 22 at drip irrigation rates and at a controlled pressure, preferably through a pressure regulator and a filter, typically using a pump for water recirculation and a time clock to control pump operation time periods to provide the needed watering for whatever plants are growing in the pots. Thus any fertilizers that are in the water are simply collected and recirculated, typically with the filtering avoiding collection or clogging of solid matter in the water circulation system.

Figure 4:
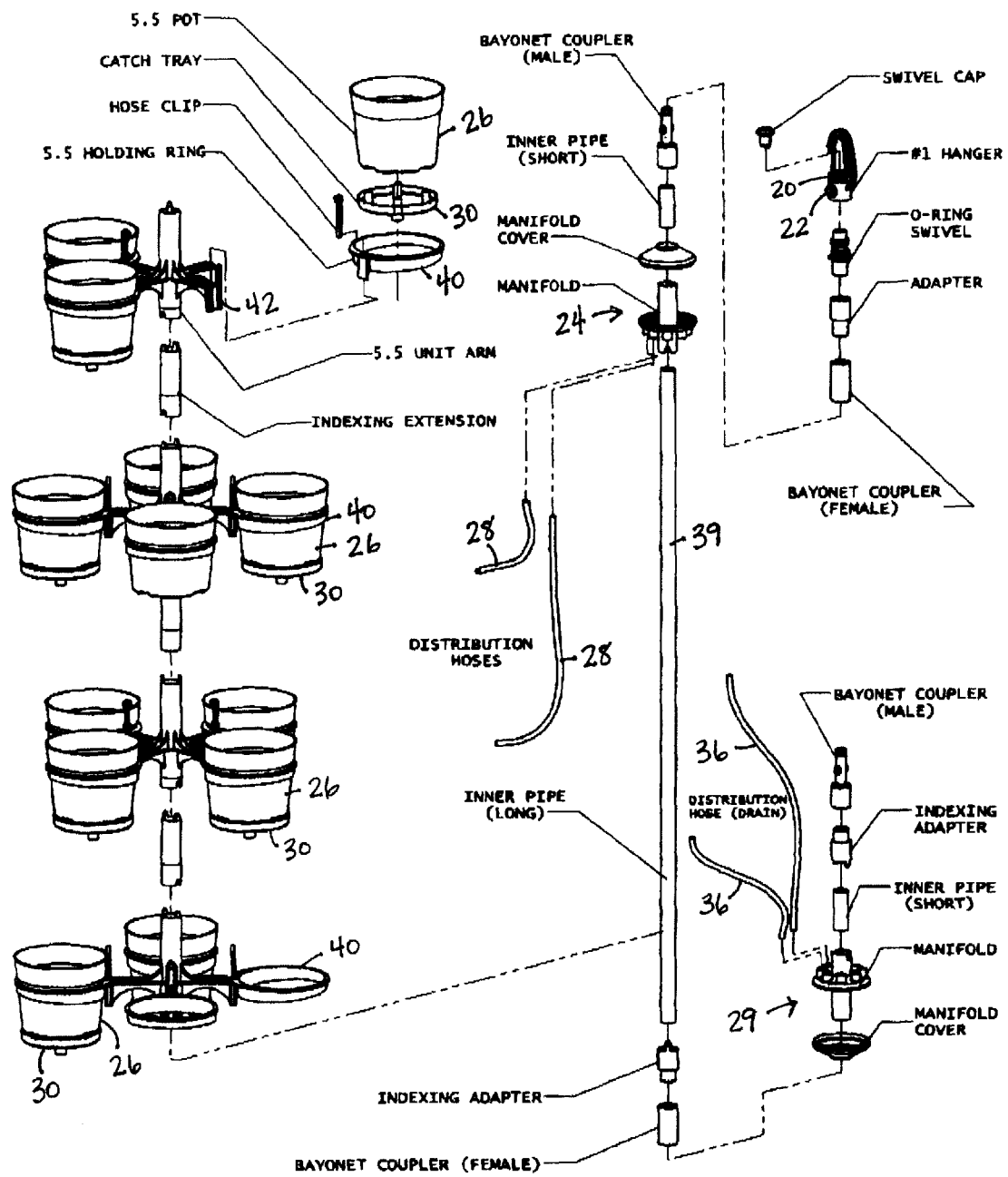
FIG. 4 is an exploded view of the embodiment of the hanging stacked plant holder and watering system of FIG. 1.

An exploded view of this embodiment of the invention may be seen in FIG. 4. As may be seen toward the upper right of the Figure, a tubular O-ring swivel having a pair of spaced apart O-rings with an opening through the plastic swivel between the O-rings is pushed into an opening in the hangar, with a swivel cap being glued thereto to capture the O-ring swivel in the hangar so that the water inlet 22 (FIG. 1) provides water to the region between the pair of O-rings on the O-ring swivel, and thus into the inner diameter of the swivel. Glued to the bottom of the O-ring swivel is a tubular adapter with a female bayonet coupler glued to the adapter. This allows that upper assembly just described to mate with and be decoupled from the primary assembly of the hanging stacked plant holder about to be described.

At the top of the main assembly is a male bayonet coupler with a short inner pipe glued thereto which is glued to a pipe through the manifold. Either the pipe through the manifold or the long inner pipe 39 are plugged, with the manifold pipe having one or more holes therein so that water passing through the male bayonet coupler will be distributed into the manifold, with the manifold cover being cemented to the manifold pipe and the manifold itself so as to prevent leakage. The male bayonet coupler at the top of this assembly has an O-ring at the top thereof so as to provide a watertight seal with respect to the female bayonet coupler when connected thereto. Of course the distribution hoses are flexible plastic hoses and merely press into suitable connections at the bottom of the manifold, but need not be glued thereto as they neither support any significant weight nor are subject to any water pressure.

Figure 5:
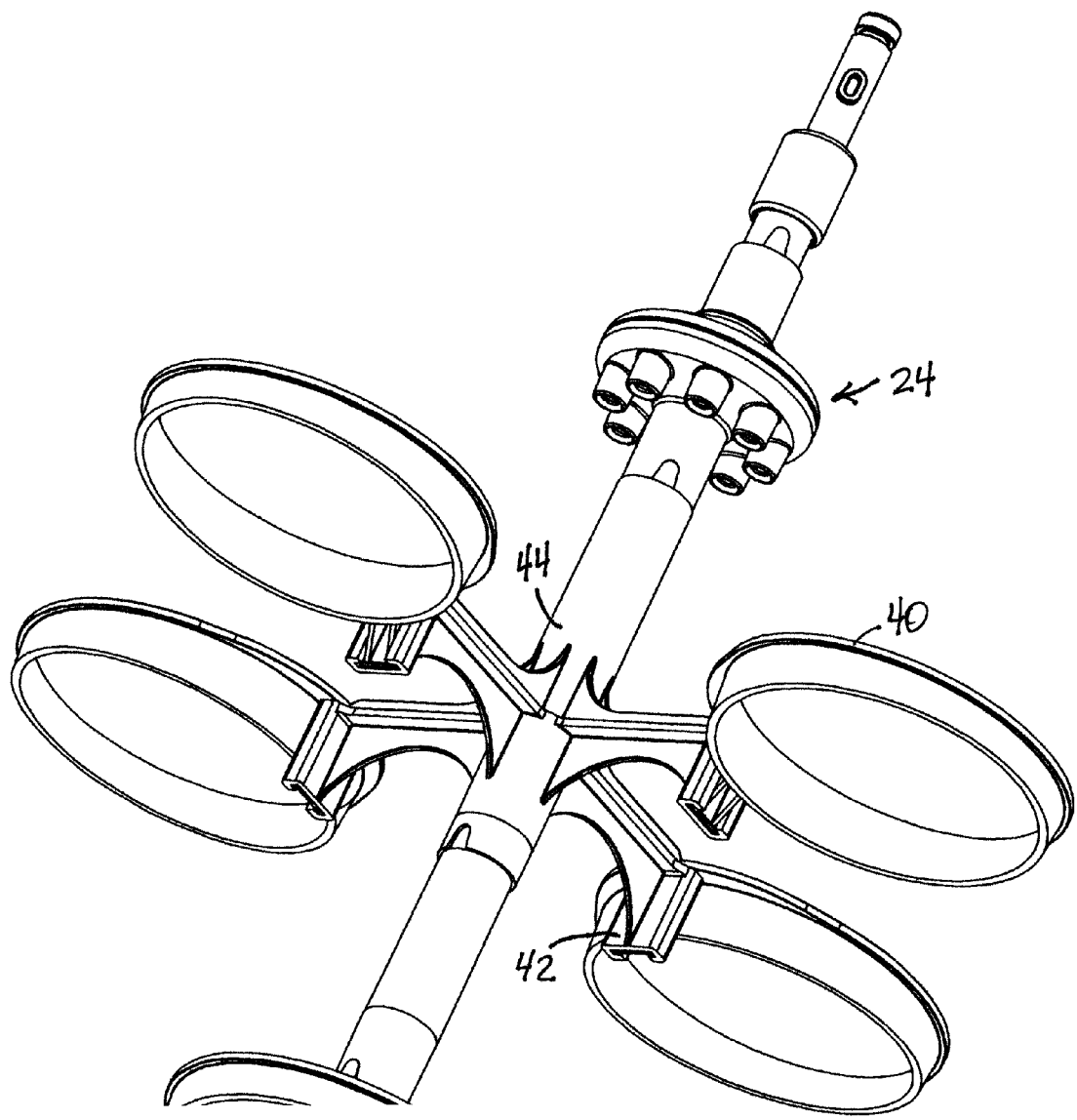
FIG. 5 illustrates the assembly of the holding rings 40 and the manifold 24.

The pots used with one embodiment are 5.5 pots having the catch tray 30 (FIGS. 1-3) snapped thereon and fitting within the 5.5 holding rings shown in FIG. 4 and also on an expanded scale in FIG. 5. The 5.5 holding rings 40 (FIG. 5) having a tab thereon that slides into a slot in the ends 42 of the 5.5 unit arm (FIG. 4), also shown in FIG. 5 as the 5.5 unit arm member 44. Four such unit arm assemblies are used, with an indexing extension (FIG. 4) extending therebetween, with indexing protrusions mating with the 5.5 unit arms so that each 5.5 unit arm is rotated with respect to the unit arm thereabove and/or therebelow by 45°.

The long inner pipe fits through the entire stack of the 5.5 unit arms and the indexing extensions, with an indexing adapter being glued to the bottom of the long inner pipe to hold the stack together, with another female bayonet connector being glued to the indexing adapter.

To the lower right of FIG. 4 may be seen an exploded assembly of a male bayonet coupler, an indexing adapter, a short inner pipe, a manifold and a manifold cover, all of which are glued together. As before, the male bayonet coupler has an O-ring at the top thereof to prevent water leakage when the same is inserted into the female bayonet coupler. The manifold and manifold cover in this assembly are preferably identical to the manifold and manifold cover near the top of long inner pipe, though mounted upside down for water collection through collection hoses 36 (FIG. 3). Thus in the preferred embodiment, three major assemblies are used, the first being the mounting, the second being the assembly of the distribution manifold, pots, distribution hoses, etc., and the third being the collection manifold assembly.

The hangar 20 (FIGS. 1-3) is sized to conveniently hook over a supporting pipe, hook or other member, or hang from cord looped over a beam such as a patio cover beam. The swivel fastened to the hangar allows the assembly to be rotated relative to the hanger, such as perhaps once a day or every other day to equalize sunlight on the plants. In a preferred embodiment, all parts are PVC plastic, having good ultraviolet radiation resistance and being readily glueable through common solvent-type cements, or alternatively in at least some cases, could be spin welded together if desired. The net result is an attractive and highly serviceable hanging stacked plant holders that may be used both as a consumer product and commercially.

Note that in alternate embodiments, fewer, or even more layers of pots may be used by simply replicating the pot assemblies, indexing extensions and manifolds. Obviously, units using pots of a different size, etc., or even different number of pots per layer could also be fabricated, depending on the needs of the user, with plants grown commercially in such pots being saleable in the pots used.

Thus while certain embodiments of the invention has been described herein, numerous variations may be made therein without departing from the spirit and scope of the invention. By way of one example, additional distribution manifolds and/or collection manifolds may be used so that each layer of pots has its own supply and collection manifold. Of course, these and other variations may be made without departing from the spirit and scope of the invention.

What is claimed is:

1. A plant holder comprising:
   a center pipe adapted for hanging from a first end thereof, the center pipe having an adapter coupled to a second end thereof;
   a plurality of pot holding rings, each receiving and supporting a pot with a bottom of each pot passing through a respective pot holding ring;
   a plurality of unit arms, each slid over the center pipe and each having a plurality of equally angularly spaced outwardly extending arms terminating with a connection mating with and supporting a mating connection on a respective pot holding ring;
   at least one indexing spacer slid over the center pipe between each adjacent pair of unit arms, the at least one indexing spacer determining spacing between the pair of unit arms indexing the unit arms to angularly offset one unit arm with respect to the other unit arm about an axis of the center pipe;
   a plurality of catch trays, each snapping under and being supported by the base of a pot extending through the respective pot holding ring for collecting water that seeps through soil in the pot;
   first and second manifolds, the first manifold being adjacent the first end of the center pipe and the second manifold being adjacent the second end of the center pipe; and
   tubing to direct water from the first manifold to each of a plurality of pots supported by two unit arms closest to the first end of the center pipe, to direct water from the catch trays of pots supported by the two unit arms to pots supported by lower two unit arms, and to direct water from the catch trays of pots supported by the lower two unit arms to the second manifold for collection.

2. The plant holder of claim 1 further comprising a hose connection for coupling to a garden hose for providing water to the first manifold.

3. The plant holder of claim 1 wherein the number of unit arms is four, and the tubing includes tubing to direct water from the first manifold to each of the plurality of pots supported by pot holding rings on the two unit arms closest to the first end of the center pipe, to direct water from the catch trays of the plurality of pots supported by pot holding rings on the two unit arms closest to the first end of the center pipe to pots supported by pot holding rings on two unit arms closest to the second end of the center pipe, and to direct water from the catch trays of pots supported by pot holding rings on the two unit arms closest to the second end of the center pipe to the second manifold for collection.

4. The plant holder of claim 1 wherein the number of arms on each unit arm is four.

5. The plant holder of claim 4 wherein an arm of each unit arm terminates with a vertical slot, and each pot holding ring has a vertical member for sliding into a respective slot for supporting the pot holding ring on the respective arm.

6. The plant holder of claim 1 further comprising a hook for hanging the plant holder from above.

7. A plant holder comprising:
   a plurality of pots;
   a center pipe adapted for hanging from a first end thereof, the center pipe having an adapter coupled to a second end thereof;
   sixteen pot holding rings, each for receiving and supporting a pot with a base of the pot extending downward through a respective pot holding ring;
   first through fourth unit arms, each slid over the center pipe and each having four outwardly extending arms equally angularly spaced about an axis of the center pipe and terminating with a connection mating with a mating connection on a respective pot holding ring to support the respective pot holding ring with a top of the pot therein facing the first end to the center pipe;
   a plurality of catch trays, each snapped under and supported by a base of a respective pot extending through the respective pot holding ring for collecting water that seeps through soil in the pot;
   the first through fourth unit arms being stacked in the order of first, second, third and fourth unit arms on the center pipe, with a pot holding ring on an end of each arm supporting a pot therein having a catch tray snapped under the base of a respective pot, the first unit arm being closest to the first end of the center pipe;
   an indexing spacer slipped over the center pipe and positioned between each two adjacent unit arms to determine spacing between the unit arms along the center pipe and to angularly position adjacent unit arms 45 degrees with respect to each other around an axis of the center pipe;
   first and second manifolds slipped over the center pipe, the first manifold being positioned adjacent the first end of the center pipe and the second manifold being positioned adjacent the second end of the center pipe, the first manifold being configured to receive water and distribute the water to eight outlets, the second manifold being configured to receive water from eight inlets and deliver water through an outlet; and
   tubing to direct water from the first manifold to each of eight pots in the pot holding rings connected to the first and second unit arms, to direct water from the catch trays of pots in pot holding rings connected to the first and second unit arms to the pots in the holding rings connected to the third and fourth unit arms, respectively, and to direct water from the catch trays of pots in the holding rings connected to the third and fourth unit arms to the second manifold for collection.

8. The plant holder of claim 7 further comprising a hose connection for coupling to a garden hose for providing water to the first manifold.

9. The plant holder of claim 7 wherein each arm of each unit arm terminates with a vertical slot, and each pot holding ring has a vertical member slid into a respective slot supporting the pot holding ring on the respective arm.

10. The plant holder of claim 7 further comprising a hook for hanging the plant holder from above.

* * * * *